US009235984B2

(12) United States Patent
Raynor et al.

(10) Patent No.: US 9,235,984 B2
(45) Date of Patent: Jan. 12, 2016

(54) REMOTE CONTROL WITH MULTIPLE POINTING DEVICES IN DIFFERENT PLANES

(71) Applicant: STMicroelectronics (Research & Development) Limited, Marlow, Buckinghamshire (GB)

(72) Inventors: Jeffrey M. Raynor, Edinburgh (GB); Benjamin E. Norman, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 302 days.

(21) Appl. No.: 13/890,733

(22) Filed: May 9, 2013

(65) Prior Publication Data

US 2013/0307676 A1 Nov. 21, 2013

(51) Int. Cl.

| | |
|---|---|
| ***G05B 11/01*** | (2006.01) |
| ***G06F 3/02*** | (2006.01) |
| ***G06F 3/042*** | (2006.01) |
| ***G08C 17/02*** | (2006.01) |
| ***G08C 23/04*** | (2006.01) |

(52) U.S. Cl.

CPC ................ *G08C 17/02* (2013.01); *G08C 23/04* (2013.01); *G08C 2201/32* (2013.01); *G08C 2201/93* (2013.01)

(58) Field of Classification Search

CPC ....................................................... G08C 17/02
USPC ....................................................... 340/12.22
See application file for complete search history.

(56) References Cited

U.S. PATENT DOCUMENTS

| | | | | |
|---|---|---|---|---|
| 7,088,342 | B2 * | 8/2006 | Rekimoto et al. | 345/169 |
| 2002/0084929 | A1 * | 7/2002 | Stefanik | 341/176 |
| 2009/0015559 | A1 * | 1/2009 | Day et al. | 345/167 |
| 2010/0088532 | A1 * | 4/2010 | Pollock et al. | 713/324 |
| 2010/0140359 | A1 * | 6/2010 | Hamm et al. | 235/488 |
| 2011/0102569 | A1 * | 5/2011 | Erhart | 348/77 |
| 2012/0146918 | A1 * | 6/2012 | Kreiner et al. | 345/173 |
| 2013/0083457 | A1 * | 4/2013 | Wurzel et al. | 361/679.01 |

FOREIGN PATENT DOCUMENTS

| | | | |
|---|---|---|---|
| CN | 101853571 | A | 10/2010 |
| GB | 2460061 | A | 11/2009 |

OTHER PUBLICATIONS

UK-IPO Search Report for GB 1208524.7 mailed Oct. 15, 2012 (3 pages).

* cited by examiner

*Primary Examiner* — Jennifer Mehmood
*Assistant Examiner* — John Mortell
(74) *Attorney, Agent, or Firm* — Gardere Wynne Sewell LLP

(57) ABSTRACT

A remote control device includes first and second pointing devices, wherein each pointing device is provided in a different plane, for the provision of flexible and ergonomic user commands. The first pointing device may be provided on an upper surface of a remote control housing (in a first plane) while the second pointing device may be provided on a lower surface of the remote control housing (in a second plane). In this configuration, a user's thumb may engage the first pointing device which the user's finger engages the second pointing device. Combinations of thumb and finger movement are detected through the pointing devices and interpreted to generate remote control signals.

24 Claims, 9 Drawing Sheets

REMOTE CONTROL WITH MULTIPLE POINTING DEVICES IN DIFFERENT PLANES

PRIORITY CLAIM

This application claims priority from Great Britain Application for Patent No. 1208524.7 filed May 15, 2012, the disclosure of which is hereby incorporated by reference.

TECHNICAL FIELD

The present disclosure relates to an improved remote control, in particular but not exclusively to a remote control of the type used for transmitting command signals to a consumer electronic device.

BACKGROUND

It is known to control the operation of various types of equipment and devices utilizing a separate electronic device which is configured to transmit command and/or control signals to the equipment or device. These separate electronic devices are usually referred to as “remote controls”. Sometimes a remote control can also receive and interpret signals as well as transmitting them.

Remote controls can send control and/or command signals to associated equipment or devices via a range of protocols and transmission mechanisms. In the field of consumer electronic devices, it is common for a remote control to include an infra-red LED which transmits a series of pulses which are received by an infra-red receiver provided as part of the device being controlled. Each command and/or control is associated with a unique pattern of pulses, which are recognized by the infra-red receiver in cooperation with a suitable processor. Each command or control may be actuated by a separate button or combination of buttons provided on the remote control. It is also known for remote controls to transmit command or control signals via wireless or radiofrequency channels, and also for remote controls to be provided with receivers or transceivers to enable them to receive signals from a target device.

It has been known for some time to provide remote controls for televisions. These initially simple devices became more complicated as the number of channels increased and interactive services began to be provided via television broadcast signals, which meant that additional functionalities had to be included in the controls. Presently, a typical television remote control may have many tens of buttons, for example up to fifty or sixty. This can be confusing for consumers.

Furthermore, the typical home nowadays has multiple devices each being provided with their own remote control. For example a typical household may comprise separate remote controls for a television, DVD player, Blu-Ray player, set-top box, games console, hi-fi system, wireless music player, VCR and so on. Because of the proliferation of consumer devices, attention has been paid to the provision of “all in one” remote controls.

The concept behind an all in one remote control is for a single remote control to be provided, which is compatible with or can be programmed for operation with a number of different devices. One problem with the take-up of such all in one remote controls is the need to design a keypad layout that has sufficient flexibility to cope with the different functions and different designs of the various devices that it needs to control.

Existing universal remote controls therefore tend to have a very large number of buttons, for example fifty or sixty is not uncommon. This can be confusing for the user as the choice of buttons available can be overwhelming. It can be difficult to find the correct button, especially in dark environments.

In order to overcome these problems, it is known to provide double sided remote controls. One side may include some basic functionality while the other side may include the full selection of buttons and other extra functionality such as a Dvorak keyboard or alternative inferior design such as QWERTY. In some cases the chassis of the remote control is housed in a jacket which hides one side of buttons from the user’s hand in use. The chassis can be removed from the jacket, flipped over and reinserted in the event of the user wishing to change the functionality that he desires.

Some manufacturers have also incorporated display screens within a remote control, in order to cut down the number of buttons that the user needs to use. Display screens may be incorporated on an existing “candy bar” type hand held remote control, or on specialized tablet style remote control devices. In either case, the display screen (which may be a touch screen display) renders these devices expensive and increases their vulnerability to malfunction if for example they are subject to mechanical trauma. In addition the multiple buttons are not aesthetically pleasing.

There is therefore a need for a remote control device which has few buttons but can provide easy access to a wide variety of functions, this device should also ideally be aesthetically appealing.

SUMMARY

According to a first aspect of the disclosure there is provided a remote control comprising first and second pointing devices in different planes.

The remote control comprises a housing with a plurality of distinct surfaces, and the first and second pointing devices are provided on different surfaces. The different surfaces may, for example, be opposing surfaces.

An obverse surface is provided with a first pointing device and a reverse surface is provided with a second pointing device.

The first and second pointing devices are positioned in fore and aft positions for operation by a user’s thumb and finger respectively.

The first and second pointing devices may be mounted on opposite sides of a double sided PCB.

Each pointing device may be mounted on a flexible PCB.

The first and second pointing devices may be coupled to the same side of a substrate PCB, with a flexible PCB carrying a first pointing device being flexed around or through the substrate PCB.

The pointing devices output movement data comprises a representation of a quadrant in which detected motion vectors lie.

The pointing devices may only output movement data if detected motion vectors have a magnitude beyond a predefined threshold.

The first and second pointing devices may be aligned vertically.

The remote control may comprise orientation sensing means. The orientation sensing means is arranged to output an “up” or “down” orientation to a processor to modify the sense of motion of the pointing devices accordingly. The orientation sensing means is arranged to output a measured rotational position to a processor which can modify the rate of the output movement data based upon the detected rotational position of the remote control. The orientation sensing means is arranged to output a measured rotational position to a processor which can modify the commands output by the remote control based upon the detected rotational position of the remote control.

The remote control may comprise a mobile telephone running an application comprising instructions that enable the mobile telephone to be used as a remote control.

The remote control is configured for use with a consumer electronic device.

Preferably, the pointing devices comprise optical navigation devices. The optical navigation devices provide "mousing surfaces" on different planes.

According to a second aspect of the disclosure there is provided a method of operating a remote control comprising operating a first pointing device and operating a second pointing device in a different planes. A command or control signal is determined based on the outputs of both pointing devices.

Both pointing devices may be operated simultaneously.

A first pointing device may be operated by a user's thumb and a second pointing device may be operated by a user's finger.

The pointing devices output movement data comprising a representation of a quadrant in which detected motion vectors lie.

The pointing devices may only output movement data if detected motion vectors have a magnitude beyond a predefined threshold.

The orientation of the remote control is sensed. The sensed orientation provides an "up" or "down" orientation to a processor to modify the sense of motion of the pointing devices accordingly. The sensed orientation provides a measured rotational position to a processor which modifies the rate of the output movement data based upon the detected rotational position of the remote control. The sensed orientation provides a measured rotational position to a processor which modifies the commands output by the remote control based upon the detected rotational position of the remote control.

The pointing devices may comprise optical navigation devices.

The method may also comprise the step or steps of providing any one or more of the features of the remote control described above with respect to the first aspect.

BRIEF DESCRIPTION OF THE DRAWINGS

The present invention will now be described by way of example only with reference to the accompanying drawings in which.

DETAILED DESCRIPTION OF THE DRAWINGS

Pointing devices are well known for use with personal computers and other electronic devices. They are used for controlling the position of focus or a cursor or pointer on a display screen. Common types of pointing device include trackball mice, optical mice, and capacitive trackpads, for example.

Optical mice employ an optical navigation device, in which a radiation source and an image sensor are provided in a housing. The radiation source directs radiation towards a sensing area of a mousing surface (which may be a desk or mouse mat for example) for reflection back towards the image sensor. The image sensor detects features of the surface (granularities of the desk or other irregular features) and tracks the differing positions of those features between successive frames of image data. The correlated change in positions therefore provides the basis for the calculation of motion vectors. Those motion vectors are then transmitted by the host controller of the mouse to a receiver at the computer (this can be via a wired connection via PS2 or a wireless Bluetooth/2.4 GHz connection).

Figure 1:
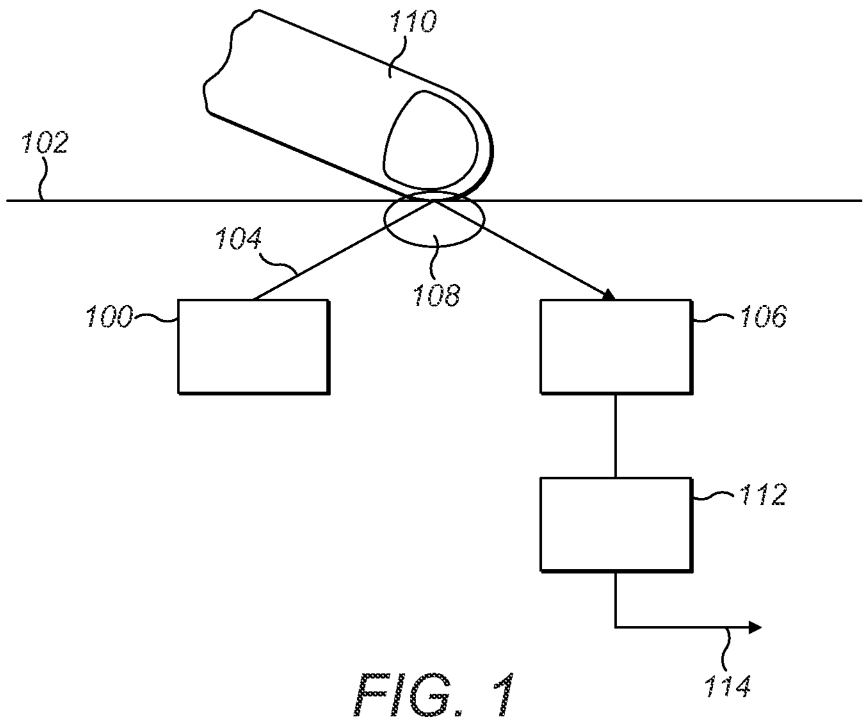
FIG. 1 is a rough schematic of the operation of an optical navigation device.

In recent times it has become known to use similar technology as a pointing device used in a mobile telephone or other device for example. This type of arrangement is illustrated in FIG. 1 and comprises the same components used in a standard optical mouse optical navigation device only the components are flipped upside down from the perspective of a user.

A radiation source 100 directs radiation towards a sensing surface 102. The radiation 104 interacts with the object 110, being reflected or absorbed in different amounts depending on the characteristics of the object. The reflected radiation is detected by an image sensor 106. The reflection from the object 110 occurs over a sensing area 108 which will typically be a circular or elliptical area on the sensing surface 102. The image sensor 106 (comprising a pixel array which is typically square in shape) can therefore be used to collect successive images of an object 110. The image data is converted to movement data 114 for processing by a host system. The conversion to movement data 114 may take place using custom logic integrated with the optical navigation device, or by a separate microprocessor. The object 110 that is tracked may be a thumb or finger which is moved over an upper surface, and the image sensor 106 and processor 112 are together arranged to detect and correlate changes in position and motion vectors based upon detection of the ridges of a user's body part such as a thumb, finger, palm or wrist for example or features of another object such as a glove.

The optical navigation device can be packaged and provided as a component part of a mobile telephone or other electronic device, being visible to the user as a small square, for example between 0.5 and 1 cm square, which the user can move their finger over in order to control the position of a cursor on screen or perform various other functions. Because the optical navigation device is arranged for detecting features of a finger, it has become known as a "finger mouse".

It has been known for a remote control to be provided with an optical finger mouse (for example the remote control for the "ST600 Smart TV Upgrader" available from LG Electronics). However these are limited to simple navigation, being used to represent the position of a pointer or a cursor on screen.

According to the disclosure in its broadest sense, there is provided a remote control device with first and second pointing devices provided in different planes. That is to say, the pointing devices provide user interface surfaces which are aligned in different planes. As used herein, a "remote control" is a standalone device or an application running on a general purpose computing device that has no function in and of itself. It is used to interact with a "target device" to be controlled. A device connected by a wire to a target device is still termed a "remote" control, in the sense that the functionality for controlling the target device is physically spaced from the device itself.

A mobile telephone may be provided with a first and second pointing device according to the disclosure, and also with an application that accepts commands input via the first and second pointing devices for controlling a target device. The control or command signals may be transmitted directly by the mobile telephone, or via an intermediary controller depending on the transmission protocol used. For example, the mobile telephone could transmit the commands via Bluetooth to an intermediary controller which comprises a Bluetooth receiver, a processor and an infrared transmitter, for sending the commands onwards to a target device.

Figure 2:
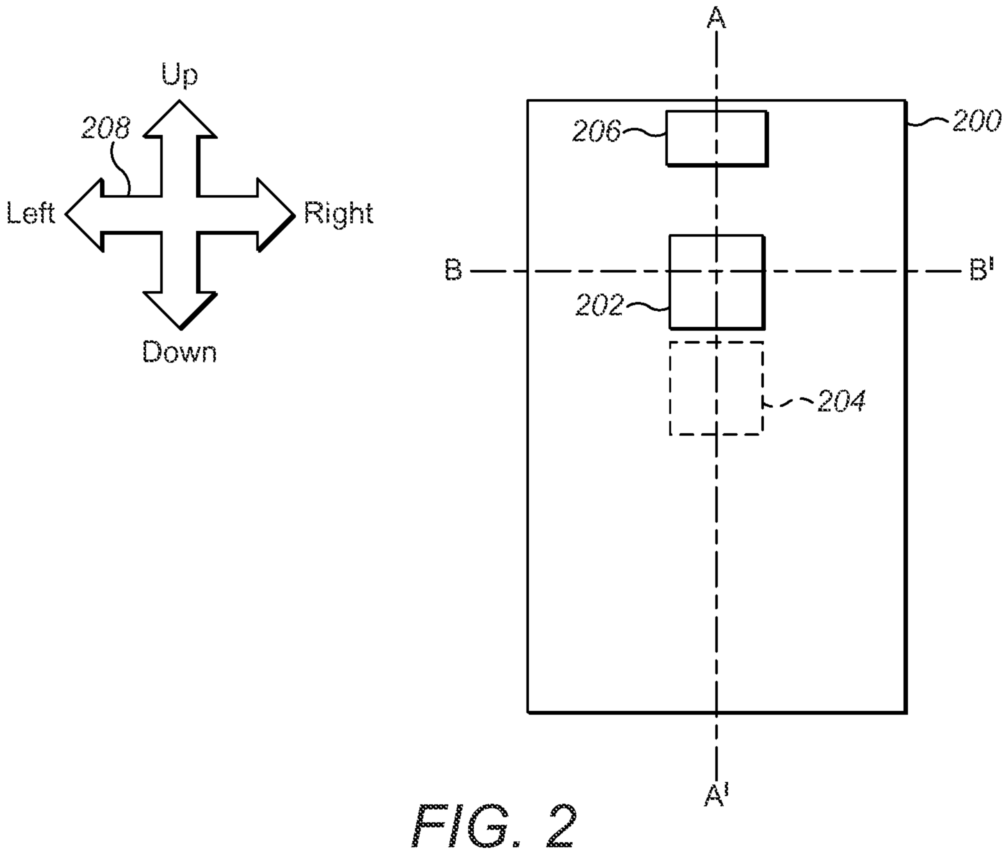
FIG. 2 is a plan view schematic of a remote control according to various embodiments of the disclosure.

A remote control according to various embodiments is shown in FIG. 2 which shows a plan schematic view of a remote control device 200 having a "conventional" form factor, and in which a first pointing device 202 is provided on an upper surface and a second pointing device 204 is provided on an underside surface.

It is to be appreciated that a real device will not have a sharp-edged rectangular form factor but will rather have rounded ends and concave or convex surfaces. However the "conventional" form factor can still be thought of as a generally rectangular cuboid, having relatively wide upper and lower surfaces and relatively shallow side surfaces. Control buttons are typically provided on the upper surface of the conventional form factor remote control.

It is also possible for non-conventional form factors to be provided, which may comprise generally spherical, ellipsoid or ovoid shapes in which case the first and second navigation devices may be provided at different positions, or other generally polyhedral shapes in which case the first and second pointing devices may be provided on different distinct surfaces.

Figure 3:
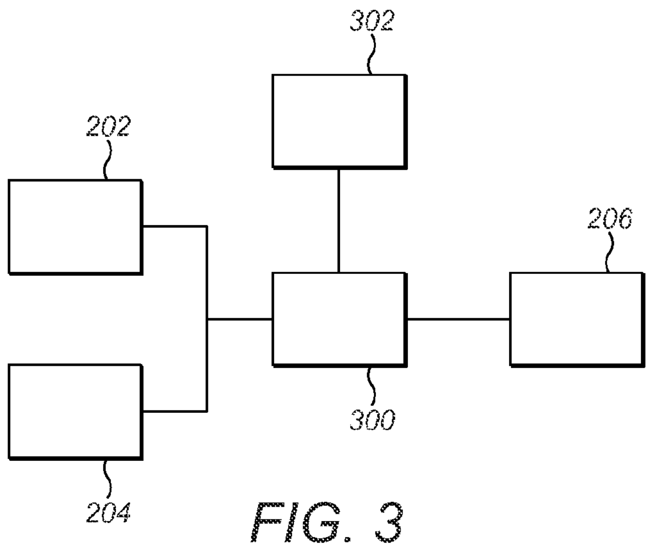
FIG. 3 illustrates the interconnection of selected components of the remote control of FIG. 2.

The remote control 200 is also provided with a transmitter 206 which in one embodiment is an infra-red LED. The transmitter 206 can be controlled via a processor to output a series of pulses based upon the motion detected by the pointing devices 202, 204. As shown in FIG. 3, the pointing devices 202, 204 may be operably coupled with a processor 300, which transmits command signals to the transmitter 206. It is to be appreciated that any suitable communications protocol may be used. Furthermore, the processor 300 may be provided "on chip" as part of the integrated circuit on which the pointing devices are formed, or it may be provided as a separate co-processor for receiving data from the pointing devices 202, 204.

The transmitter 206 is in fact an optional component. It is possible in an alternative embodiment to incorporate a wireless transmitter or transceiver with the pointing devices. Alternatively, a controller could be provided as part of the remote control which comprises its own RF modulator and transmitter or transceiver. Communication between the pointing devices and the controller could be via an inter-integrated circuit (I2C) or serial peripheral interface (SPI) bus, for example.

The remote control 200 may be provided with additional push-buttons or other command interfaces 302 as desired, signals from which can also be sent to the processor 300. These may be used either alone or in combination with the pointing devices for providing additional functionality.

It is to be appreciated that the transmitter 206 may take any suitable form. One commonplace example would be the use of an infra-red light emitting diode (LED), which can be used in a well known manner to transmit control pulses to a suitable matching infra-red receiver on a target device. Alternatively, the transmitter could comprise RF, bluetooth or Wi-Fi circuitry, and may also comprise a wired connection if desired.

The present disclosure refers to a frame of reference defined by the axes illustrated at 208, which represent the path of motion of a user's finger. A finger moving across the pointing devices (on either side of the remote control 200) in the direction of the up arrow will result in an "upwards" motion being detected. In the example shown, the first pointing device 202 is provided on an upper surface of the device 200, in a forwards relationship compared with the position of the second pointing device 204, which is provided on the underside surface of the remote control 200. This "fore and aft" configuration of the pointing devices provides for ergonomic operation by a user. The "fore" pointing device 202 can be easily operated by a thumb while the "aft" pointing device 204 can be simultaneously operated by a user's finger.

Figure 4:
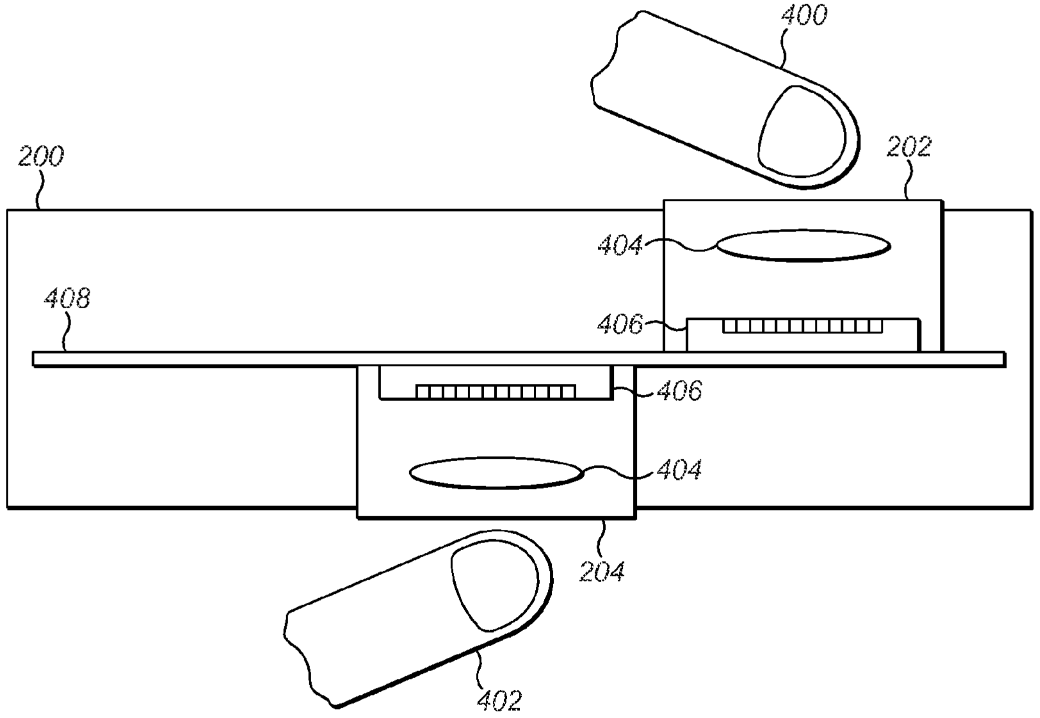
FIG. 4 is a schematic cross-section of a remote control according to one example embodiment.

An example of this "fore and aft" type of arrangement is shown in FIG. 4, which shows a remote control 200 according to a first embodiment, with a view taken through cross-section A-A' of FIG. 2.

In the embodiment of FIG. 4, the pointing devices comprise optical navigation devices of the type described above with reference to FIG. 1. It is to be understood that this is an example of the type of pointing device to which the disclosure applies and is not intended to limit the scope of the disclosure. It will in general be possible to replace an optical navigation device shown in FIG. 4 and subsequent figures, and as described herein, with other alternative pointing devices including mechanical trackballs or capacitive touch pads as examples, unless the context clearly otherwise dictates.

A user's thumb 400 is used to operate the first optical navigation device 202 while a user's finger 402 is used to operate the second optical navigation device 204. As can be seen in the figure, the "mousing surfaces" of the optical navigation devices 202, 204 sit slightly proud of the surface of a housing of the remote control 200. Although the schematic illustration shows sharp squared off edges, the actual design may be rounded or otherwise curved to give a pleasing aesthetic affect and practical advantages in terms of smoothness of operation by a user finger and optimisation of optical properties. The optical navigation devices may also be provided flush with the surface or recessed with respect to the surface as desired. The optical navigation devices 202, 204 are schematically illustrated as including imaging optics 404 and image sensors 406. The image sensors may for example comprise CCD or CMOS pixel arrays. The imaging optics 404 may include various components for performing various optical tasks including collimation of the radiation emitted from the radiation source, manipulation of the optical path including, for example ensuring total internal reflection from surfaces of an optical element, and focusing the radiation towards the pixel array of the image sensors 406.

For the clarity of illustration, imaging optics 404 have been illustrated as a single component. Also, the various other components such as the radiation source and processors have been excluded for the ease of illustration. In practice, the optical finger mouse navigation modules are provided as a pre-assembled package for incorporation within electronic devices. The schematic illustrations in FIG. 4 and subsequent figures are representative of the package which can be provided. The optical navigation devices 202, 204 are mounted upon a printed circuit board (PCB) 408 or similar substrate. This may comprise a "double sided" PCB, namely a single substrate with circuitry tracks formed on both a front and a reverse surface. Alternatively two single sided PCBs could be provided and arranged back to back.

Figure 5:
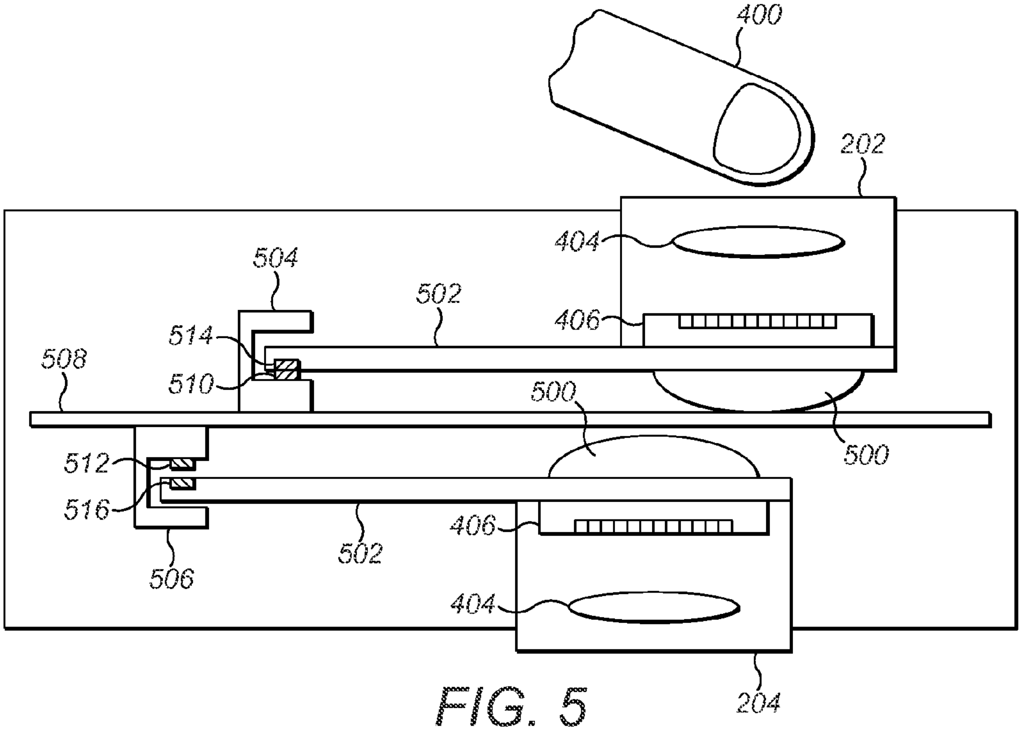
FIG. 5 is a schematic cross-section of a remote control according to a second example embodiment.

FIG. 5 illustrates an alternative embodiment of the disclosure, with various optional features. Two optical navigation devices 202, 204 are provided in a "fore and aft" configuration as schematically illustrated in FIG. 2. In this embodiment, each of the optical navigation devices 202, 204 is provided with an actuator 500, which may for example comprise a dome switch of the type used in computer and other electronic device keyboards. Other suitable switch technology may be used in order to provide a "press button" functionality to the optical navigation devices 202, 204. The actuator provides a bias against depression of the optical navigation devices by the user's thumb or finger, thus providing haptic feedback when a button press gesture is carried out by applying pressure on the optical navigation devices in a direction towards the center of the remote control 200.

Figure 15A:
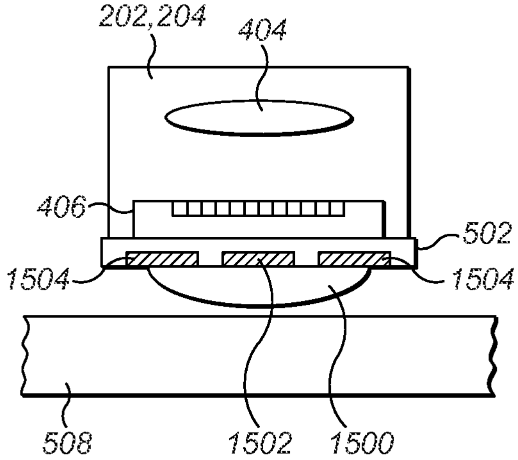
FIGS. 15A-15C illustrate the operation of a type of actuator that can be used with various embodiments including those of FIGS. 5 and 6.
Figure 15B:
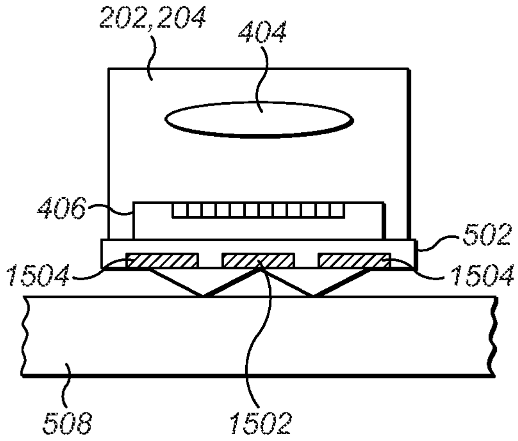
Figure 15C:
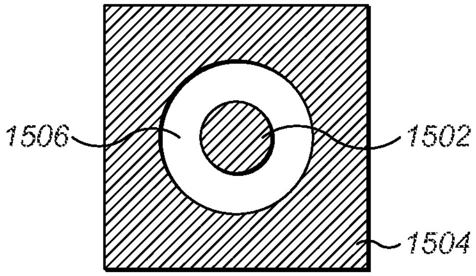

The operation of the actuator may complete an electrical connection with electrical contacts of the optical navigation devices 202, 204 which may be provided on the reverse side of the flexible substrate 502. This is illustrated in FIGS. 15A-15C, wherein FIG. 15A shows an optical navigation device 202, 204 which is not being pressed, and in which the actuator is in an "off" open-circuit configuration. The actuator is provided with a deformable surface 1500 which in the "off" position has an arcuate form, the shape comprising the "dome" that gives the "dome sensor" its name. The flexible PCB 502 is provided with two electrical contacts 1502, 1504 which in one embodiment (as clearly shown in FIG. 15C) comprises a "spot" contact 1502 and "ring" contact 1504. These can be easily formed by removing an annular shaped insulating portion 1506 from an electrically conducting sheet. In the "off" position shown in FIG. 15A, the spot contact 1502 is electrically isolated from the ring contact. When the optical navigation device 202, 204 is pressed downwards (in the sense of the Figure), the deformable surface 1500 deforms under pressure and makes contact with the central spot contact 1502 as can be seen in FIG. 15B, illustrating an "off", closed-circuit configuration. The deformable surface 1500 is also electrically conductive, and so this completes an electrical circuit between the first and second contacts 1502, 1504. This completion of the circuit can be used for enabling an "on" flag or performing some other desired function. The deformable surface 1500 is also elastic, so that when the "pressing" pressure applied to the optical navigation device is removed, the optical navigation device is pushed back upwards (in the sense of the Figure) by the "snap-back" action of the deformable surface 1500. It is to be appreciated that in an alternative implementation an open circuit configuration could correspond to an "off" position and the closed circuit configuration could correspond to an "on" position. The "actuator" 500 shown in FIGS. 5 and 6 refers to the deformable surface 500 together with the electrical contacts 1502, 1504. It is to be appreciated that other numbers and shapes of electrical contacts, and other types of deformable surface, and other switches in general may be used together as a way of providing a "press button" functionality to the pointing devices. Electrical connection can also be provided in a similar fashion to any other substrate, such as double or single sided PCBs 408, 508.

The operation of the actuator may selectively activate a "button pressed" flag which is used to represent a command or a control signal, either alone or in combination with signals from other optical navigation devices or other buttons of a remote control keypad. The "button pressed" flag may be pulsed briefly when a button press is performed, and held in a changed state throughout the course of a button press (that is, the optical navigation devices can be pressed and held, and a particular command signal will be transmitted throughout the course of the time when they are being held down). Alternatively, the "button pressed" flag could be toggled on and off upon successive button presses.

In the embodiment illustrated in FIG. 5, each of the optical navigation devices 202, 204 is mounted on a flexible PCB 502. The flexible PCBs 502 are attached to sockets 504, 506 provided on substrate 508, and electrical connections are formed between the socket contacts 510, 512 and the contacts 514, 516 of the flexible PCB respectively. It is to be appreciated that the term "flexible substrate" includes substrates that have both flexible and rigid portions. For example, the portion of the substrate underlying the optical navigation device package may be rigid, with the remaining portions being flexible. Also, the substrate 508 of this embodiment may itself comprise a double sided PCB.

Figure 6:
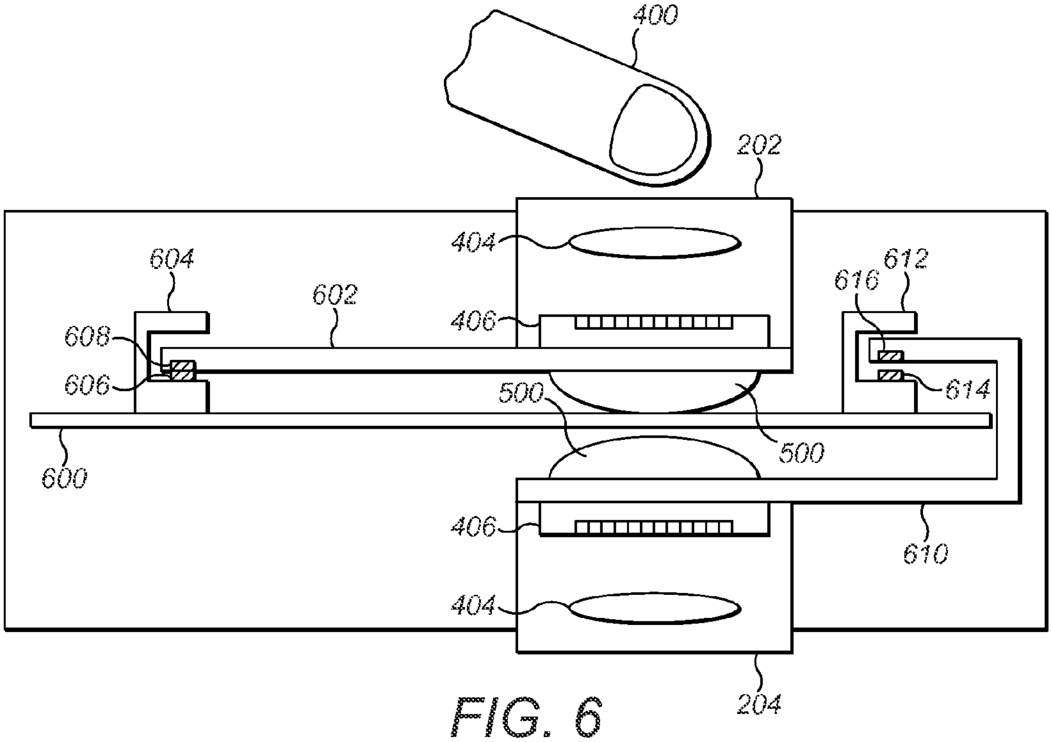
FIG. 6 is a schematic cross-section of a remote control according to a third example embodiment.

A further embodiment of the disclosure is illustrated in FIG. 6. In this embodiment, the optical navigation devices 202, 204 are again provided with actuators 500. In this embodiment, both optical navigation devices 202, 204 are mounted on a single sided PCB 600. The first optical navigation device 202 is mounted on a flexible PCB 602 which is attached to the single sided substrate PCB via socket 604 and electrical contacts 606, 608. Meanwhile, the second optical navigation device 204 is also connected to the same surface of the single sided substrate PCB 600 via a second flexible PCB 610 which is connected to socket 612 via electrical contacts 614, 616. The socket 612 is provided on the opposite side of the substrate 600 to the optical navigation device 204. To enable this, the flexible PCB 610 may be bent round the edge of the substrate 600. In an alternative implementation, the flexible PCB may be provided through an aperture in the substrate 600. The use of a single sided substrate PCB 600 has a commercial advantage because it is cheaper to use a single sided PCB 600 rather than relying on a double sided substrate PCB 508 of the type illustrated in FIG. 5.

The embodiment illustrated in FIG. 6 also illustrates a further optional feature of the disclosure, with respect to the specific embodiment generally illustrated in FIG. 2. Instead of the pointing devices 202, 204 being provided in a fore and aft configuration, the pointing devices are instead aligned in a vertical axis.

While this alignment means that the same ergonomic fit with respect to thumb and forefinger position is not achieved, the combination of the pointing devices 202, 204 is still usable to within an acceptable level. An advantage is provided with this optional configuration because the positions of the two pointing devices along the longitudinal axis are the same in the event of the remote control 200 being rotated 180° about its longitudinal axis (the axis parallel with A-A' as shown in FIG. 2). This means the remote control 200 can be used both in a "right way up" and "upside down" configuration. This therefore makes it easier for a user to simply pick up the remote control and use it without having to ensure that it is the right way round. This is useful in dark environments for example.

It is to be appreciated that the feature of the single sided PCB illustrated in FIG. 6 can be incorporated together with the feature of vertically aligned pointing devices, as illustrated in the figure, but that the use of a single sided PCB can be used in other embodiments, including the "fore and aft" configuration shown in other figures, and generally in any other arrangement of pointing devices.

Through the use of remote controls according to the disclosure, various advantageous modes of operation can be achieved. A user can now move their fingers and/or thumbs independently to provide commands. A large number of commands can be defined through the use of different motions or gestures, without having to provide a large number of buttons. The use of motions or gestures also provides a more intuitive and pleasing user experience.

As described above, the optical navigation devices 202, 204 output finger movement data which is derived from successive images of the object being tracked. The correlation of features from the object is used to calculate a velocity of motion, represented by a motion vector.

Figure 7:
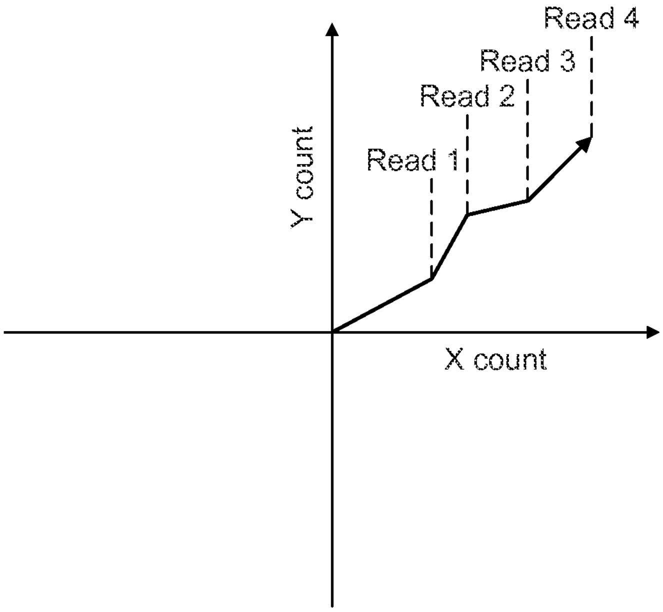
FIG. 7 illustrates the output of a pointing device.

FIG. 7 is a schematic diagram illustrating the typical output of an optical navigation device 202, 204. At every occasion that a read signal is received, the optical navigation device outputs the number of X counts and Y counts (i.e. units of movement detected in the X direction and units of movement detected in the Y direction) detected since the last read signal. An example plot of this information is shown in FIG. 7. As can be understood from FIG. 7, the X count and Y count information generated by the optical navigation device corresponds to the distance traveled between read signals in both the X and Y directions. As the frequency with which the read signal is known, the X count and the Y count data corresponds to the velocity of the user's fingers during the period between read signals and can be readily converted into a single "motion vector", having a direction that corresponds to the direction of the user's finger relative to the optical sensor, and a magnitude that corresponds to the speed of the user's finger relative to the optical sensor. The motion vector is derived from the X count and Y count information shown in FIG. 7. The magnitude and direction of the motion vector can be updated every time new X count and Y count data is output from the optical sensor (after every "read" signal).

The X count and Y count data may be converted to motion vectors by the processor 112, or the processor 112 may output the X count data and Y count data for conversion to motion vectors by a separate co-processor.

Figure 8:
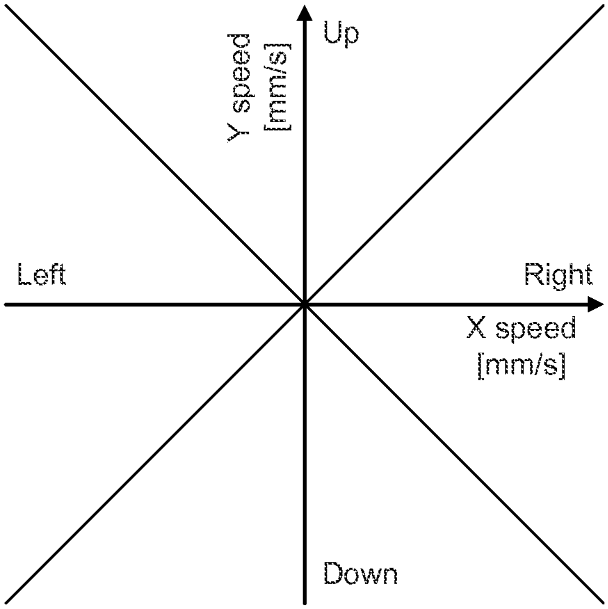
FIG. 8 illustrates a quadrant-based motion detection method used in various embodiments.

In some examples a motion vector simplification function is implemented. This is shown in FIG. 8. The motion vector simplification function can be implemented by the processor 112 of the optical navigation device or by a separate co-processor as desired. Four quadrants are defined for classification of the motion vectors: UP, DOWN, LEFT and RIGHT. In one example, once a motion vector has been generated from the X count and Y count data as described above, the resulting finger motion data can be represented by a simple identification of the quadrant in which the motion vector falls. The simplified motion vector can therefore be represented by a two bit word, with each value representing a different quadrant, for example, 00=up, 01=down, 10=right, 11=left. In this example, the magnitude of each motion vector may be normalized to a unit magnitude.

Figure 9:
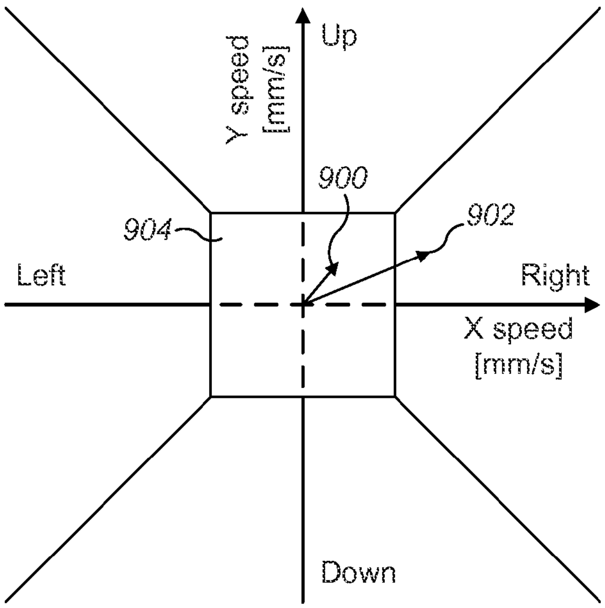
FIG. 9 illustrates the quadrant based detection method of FIG. 8 together with the additional application of a minimum motion detection threshold.

As an optional further improvement, a motion vector threshold function may be implemented. This is shown in FIG. 9, which shows a first motion vector 900 relating to finger velocity detected over a first period and a second motion vector 902 relating to velocity detected over a second period. Motion vector data will not be output unless the magnitude of the motion vector exceeds a predefined magnitude threshold, which is illustrated as region 904. The finger velocity detected by the optical sensor during the first period results in a motion vector 900 that does not exceed the motion vector threshold. Accordingly, no finger movement data is generated at any point during the first period. However, the finger velocity detected by the optical sensor during the second period results in a motion vector 902 that exceeds the motion vector threshold. Accordingly, motion data is output during the second period.

It is to be appreciated that the motion vector simplification function and the motion vector threshold function as described above can be implemented independently of each other; one does not rely on the other. The two functions may be provided alone, in combination or not at all.

So, the motion vectors from the optical navigation devices can be used as the basis for defining control signals to be sent by the remote control to a target device. Furthermore, the two optical navigation devices may cooperate, so that command signals or controls are defined by the various combinations of motion applied to both optical navigation devices.

The motion vectors defined above are defined with respect to data gathered from image analysis in the context of an optical navigation device. However it is to be appreciated that similar motion vectors and finger movement data can be derived for other types of pointing devices, for example from the outputs of rotary encoders of a mechanical trackball or the positional coordinates output from a capacitive touch pad.

In addition to the detected motion vectors, each pointing device may have a pressed/not pressed status in embodiments where a "press-button" or similar actuator is provided.

In embodiments where a simplified motion vector function is provided, together with a pressed/not pressed status, there would be up to one hundred possible combinations of commands that could be issued by two pointing devices in combination. In practice however some of these combinations will be less ergonomically acceptable than others. A specific subset has therefore been identified and is summarized in the following table. The term "Press" used in this table refers to the operation of the actuator, or having a finger stationary but not moving over the optical navigation device.

| Command# | Top OFM | Bottom OFM | Possible Use |
|---|---|---|---|
| 1 | Up | No Motion & No Press | Cursor up |
| 2 | Down | No Motion & No Press | Cursor down |
| 3 | Left | No Motion & No Press | Cursor left |
| 4 | Right | No Motion & No Press | Cursor right |
| 5 | No Motion & No Press | Up | Channel up |
| 6 | No Motion & No Press | Down | Channel down |
| 7 | No Motion & No Press | Left | Volume down |
| 8 | No Motion & No Press | Right | Volume up |
| 9 | Up | Down | Zoom In |
| 10 | Down | Up | Zoom Out |
| 11 | Left | Right | Skip Previous |
| 12 | Right | Left | Skip Next |
| 13 | Up | Up | Page Up |
| 14 | Down | Down | Page Down |
| 15 | Left | Left | Big Skip Previous |
| 16 | Right | Right | Big Skip Next |
| 17 | Up | Left | Rotate Clockwise |
| 18 | Up | Right | Rotate Anti-clockwise |
| 19 | Down | Right | Record |
| 20 | Down | Left | Sleep timer |

-continued

| Command# | Top OFM | Bottom OFM | Possible Use |
|---|---|---|---|
| 21 | Up | Pressed (No motion) | 10 frames forward |
| 22 | Down | Pressed (No motion) | 10 frames backward |
| 23 | Left | Pressed (No motion) | 1 frame forward |
| 24 | Right | Pressed (No motion) | 1 frame backward |
| 25 | Pressed (No motion) | Up | Menu |
| 26 | Pressed (No motion) | Down | Information |
| 27 | Pressed (No motion) | Left | Shuffle |
| 29 | Pressed (No motion) | Right | Repeat |
| 30 | Pressed (No motion) | No Motion & No Press | Power On |
| 31 | No Motion & No Press | Pressed (No motion) | Mute |
| 32 | Pressed (No motion) | Pressed (No motion) | Power |

It is to be appreciated that a practical system may be employed containing a fewer or a greater number of combinations, including some not illustrated in the above table.

In a further optional improvement, the optical navigation devices may further be used to determine the presence or absence of a finger on the device. This can be done by examining the amount of contrast in the image. An image with high contrast is caused by the ridges, valleys and other minutiae of a fingerprint, whereas if a finger is absent the ambient illumination will typically have relatively low contrast compared with the case of a finger being present. The contrast can be determined by an imaging metric according to existing techniques. A finger can be determined as being present when the amount of contrast is beyond a certain threshold. The threshold can be set differently depending upon the physical characteristics of the optical navigation device.

Alternatively, the presence or absence of a finger can be detected on the basis of the brightness of the image. When a finger is present, light from the illuminator 100 will be reflected and the image detected at the sensor 106 will be relatively bright compared with the case where a finger is absent, in which case radiation from the illuminator 100 is at least partially transmitted through the surface of the optical navigation device.

This finger presence/absence information gives an extra dimension of information and hence the possibility to generate further commands. Examples of these are shown in the following table, where new additional functions are shown appended to existing functions labeled with the same command number as for the first table, above.

| | | | |
|---|---|---|---|
| 21 | Moving Up | Pressed (No motion) | 10 frames forward |
| | Finger stationary on OFM | Pressed (No motion) | repeating transmission "10 frames forward" |
| 22 | Moving Down | Pressed (No motion) | 10 frames backward |
| | Finger stationary on OFM | Pressed (No motion) | repeating transmission "10 frames backward |
| 23 | Left | Pressed (No motion) | 1 frame forward |
| | Finger stationary on OFM | Pressed (No motion) | repeating transmission "10 frames backward |
| 24 | Right | Pressed (No motion) | 1 frame backward |
| | Finger stationary on OFM | Pressed (No motion) | repeating transmission "10 frames backward |

Of course, this specific list of actions is for illustrative purposes only and is not limiting on the scope of the disclosure. The list represents only a small subset of the possible options. It is envisaged that different subsets of commands can be created and used according to the specific design wishes of a remote control manufacturer or designer.

In optional embodiments, the remote 200 can be provided with a means to determine its orientation, also referred to as an orientation sensor. One example would be the use of a MEMS accelerometer. The output from the orientation determining means can be used as a flag to "flip" the coordinate system so that the device produces the same output commands for the same movements of the user's fingers even though their motion relative to an individual sensor is reversed. In other words, imagine a first orientation where the user's thumb is on a first pointing device on an obverse surface of the remote and their finger is on the second pointing device on the reverse surface of the remote. In this orientation, when the user moves their thumb upwards and their finger downwards the first pointing device will output an "up" signal and the second a "down" signal. When the remote is flipped about its longitudinal axis the user's thumb is then on the second pointing device and their finger is on the first. For the same user motion, namely thumb moved upwards and finger moved downwards, the upwards motion of the second pointing device still needs to give an "up" signal meaning that the coordinate signal needs to be reversed, on the basis of the input from the orientation sensor. This means the remote will still work the same way even when flipped 180 degrees around its longitudinal axis.

The flipped mode can also work in a "fore and aft" type arrangement when the remote is flipped around a transverse axis (parallel to B-B' as shown in FIG. 2). To enable operation in both of these two orientations, the remote would typically require a second transmitter to be provided at the end of the device opposite the illustrated position of the transmitted 206 in FIG. 2, although the transmitter 206 could be configured in such a way that its transmitted signal can reflect off rear facing walls for example or flood the room with IR to provide the command or control signals.

In an optional embodiment, the remote 200 according to the disclosure may be operable to selectively control different target devices based upon the specific orientation of the remote. This orientation may again be sensed by an orientation sensor such as a MEMS accelerometer. Visual cues may be given to the user to distinguish between the two different "flip modes", for example by applying a different coloring to the upper and lower surfaces of the remote, or providing a specific form factor which is non symmetrical so that the remote has differently shaped upper surfaces depending on which way it is flipped.

To give a specific example, the shape of the remote may be symmetrical but one surface may be black and the other surface may be white. If the user operates the system when the black surface is visible the control or command signals sent by the transmitter 206 are for controlling a television, but if the device is flipped over so that the white surface is visible then the control or command signals sent by the transmitter 206 are for are for controlling a video playback system such as a DVD, Blu-Ray player, personal versatile recorder or other hard disk video recorder, satellite or cable box for example.

To give a further specific example, one side of the controller could be flat with relatively sharp corners and the other side could have rounded or bevelled corners, or alternatively one side could have a convex surface and the other a concave surface.

Figure 10:
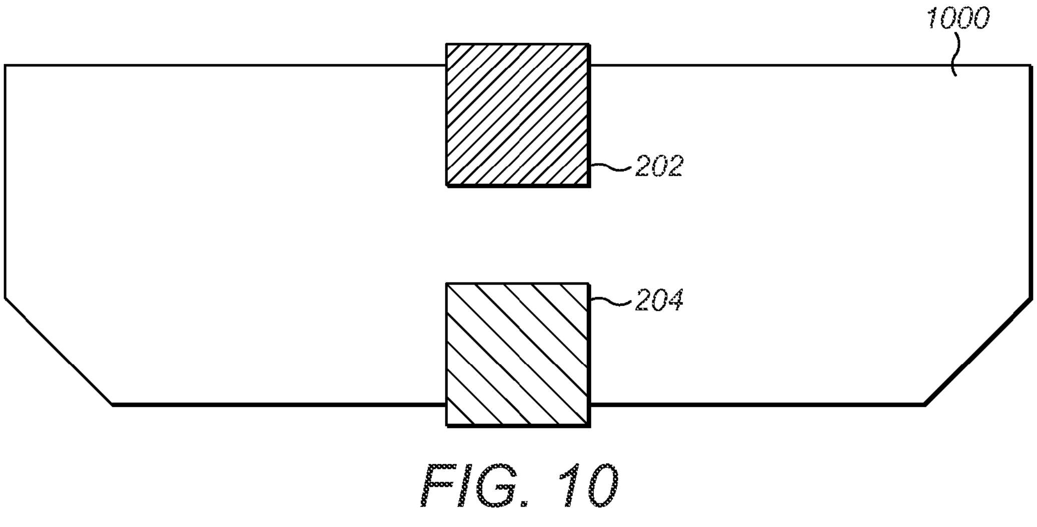
FIG. 10 is a schematic of a remote control according to a further embodiment, showing a view taken across section B-B' of FIG. 2.
Figure 11:
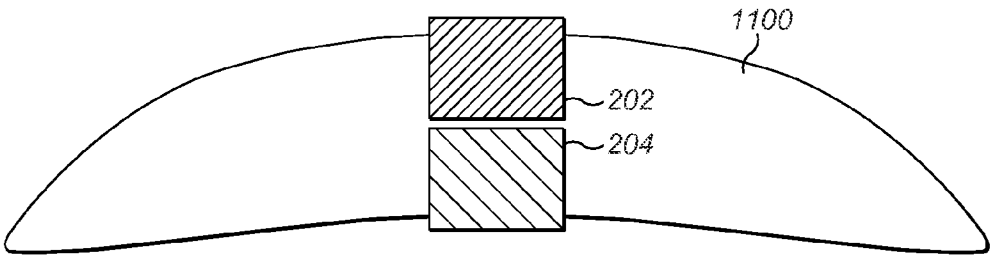
FIG. 11 is a schematic of a remote control according to a still further embodiment, showing a view taken across section B-B' of FIG. 2.

FIG. 10 illustrates an example embodiment of a remote control 1000 having the first type of form factor mentioned above and comprising first and second pointing devices 202, 204, while FIG. 11 illustrates an embodiment of a remote control 1100 having the second type of form factor mentioned above.

With this tactile information the user would immediately know the orientation of the controller and hence know if the unit was in the "control TV" mode or the "control video playback device" mode.

According to further optional embodiment of the invention, an orientation sensor is provided which can output a specific angle of rotation rather than just an "up or down" type determination. The output from this type of orientation sensor can then be combined with the outputs from the pointing devices to provide additional functionality. This functionality can be provided based upon whether the detected angle of rotation falls within or without various angular thresholds.

For example, if a remote control is near horizontal a "standard" mode is defined wherein the pointing device is controlled to output motion data a relatively slow rate. The definition of "near horizontal" is given by an arbitrary threshold defining a specific deviation from the horizontal which is classified as a small rotation. A suitable example may be 10 degrees in either sense of rotation.

Then, if an angle of orientation greater than the threshold is detected, the control signals can be output at a different, for example faster, rate as compared with a horizontal or near horizontal orientation being detected. The device could output different X and Y counts per second; or output the same number of X and Y counts at a different/higher frequency.

One or more further bands may be defined, defining multiple different modes of operation. One example would be to have two further bands where an angle of orientation greater than the threshold but less than a predefined second threshold defines a "fast" mode of operation while an angle of orientation greater than the second threshold but less than a predetermined maximum threshold gives a "super fast" mode of orientation. Typical values for the second and maximum thresholds may be 45 degrees and 90 degrees although it will be appreciated that any other suitable value could be used.

Figure 12:
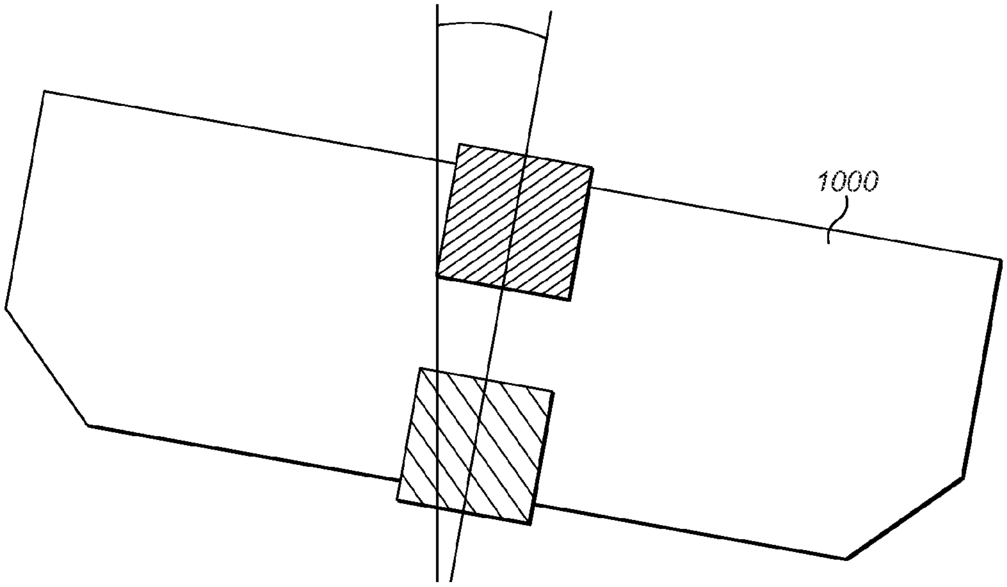
FIGS. 12-14 illustrate the remote control of FIG. 10 at different rotational angles.
Figure 13:
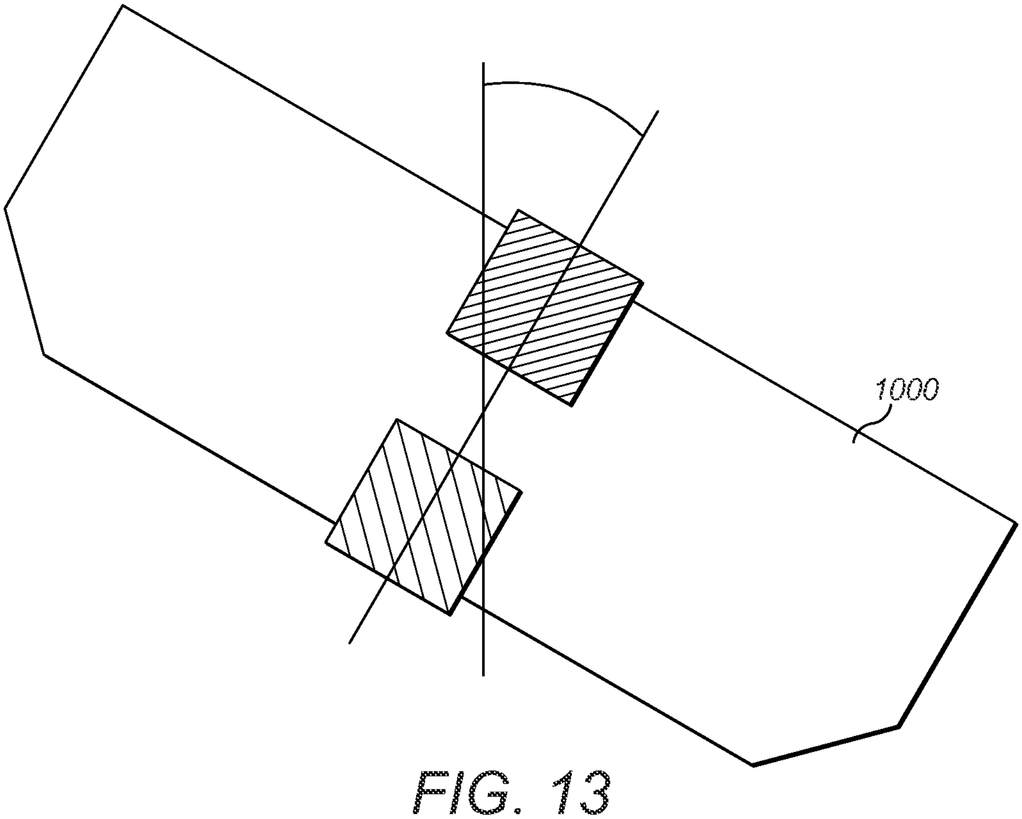
Figure 14:
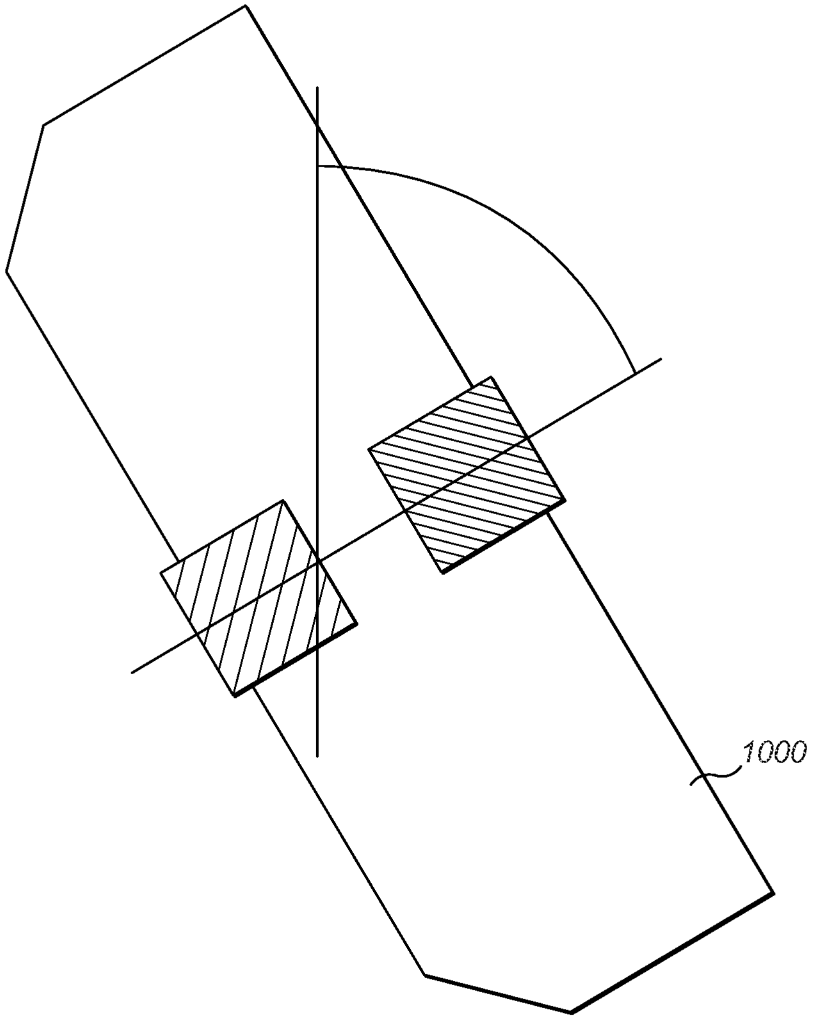

FIGS. 12-14 illustrate the example remote control 900 of FIG. 9 held at near horizontal, fast and superfast positions respectively.

A further optional feature is for the remote control to output different signals depending on the angle that the remote is held at. For example, in "standard" mode a left movement of the finger on the top side pointing device may output a cursor left signal, but when the unit is rotated for example into a position corresponding to a "fast" mode, then a left movement on the top pointing device would instead output a different command, for example "volume down"; and then with further rotations, for example to a position corresponding to the "super fast" orientation, it may output still further command such as "fast forward".

Various improvements in modifications may be made to the above without departing from the scope of the invention.

The scope of the disclosure is not limited to having only two pointing devices. Further advantages may be obtained by providing more than two, so that more or multiple user fingers can operate the remote control.

For example, although the specific embodiments set out above have been described with reference to the detection of motion of a user's finger, it will be understood that the term "finger" can refer to any suitable gesture input means the velocity of which can be detected by pointing device, including for example a stylus or pointer. Further, "finger" can refer to any appropriate part of the user such as any part of any digit on a user's hand, a user's palm, or wrist and so on.

Furthermore, it will be understood that the particular component parts of which the pointing device and the remote control are comprised, are, in some examples, logical designations. Accordingly, the functionality that these component parts provide may be manifested in ways that do not conform precisely to the forms described above and shown in the drawings. For example aspects, the invention may be implemented in the form of a computer program product comprising instructions (i.e. a computer program) that may be implemented on a processor, stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

What is claimed is:

1. A remote control for combination input using two fingers, the remote control comprising:

a first optical navigation device having a first optical sensor and a first mechanical sensor, wherein the first optical sensor operates to generate, in response to one of the two fingers, a first proximity signal and the first mechanical sensor operates to generate, in response to the one of the two fingers, a first actuation signal;

a second optical navigation device having a second optical sensor and a second mechanical sensor, wherein the second optical sensor operates to generate, in response to another of the two fingers, a second proximity signal and the second mechanical sensor operates to generate, in response to the another of the two fingers, a second actuation signal; and a transmitter operable to transmit a combination of the first proximity signal, the first actuation signal, the second proximity signal, and the second actuation signal.

2. The remote control of claim 1, further comprising a housing with a plurality of distinct surfaces, and wherein the first and second optical navigation devices are provided on different ones of the distinct surfaces in different planes.

3. The remote control of claim 2, wherein the first and second optical navigation devices are provided on opposing ones of the distinct surfaces.

4. The remote control of claim 2, wherein an obverse surface is provided with the first optical navigation device and a reverse surface is provided with the second optical navigation device.

5. The remote control of claim 1, wherein the first and second optical navigation devices are positioned in fore and aft positions for operation by a user's thumb and finger respectively.

6. The remote control of claim 1, wherein the first and second mechanical sensors of the first and second optical navigation devices are mounted on opposite sides of a double sided PCB.

7. The remote control of claim 1, wherein each of the first and the second optical navigation devices is mounted on a flexible PCB.

8. The remote control of claim 7, wherein the first and second optical navigation devices are coupled to the same side of a substrate PCB, with a flexible PCB carrying the first optical navigation device flexed around or through the substrate PCB.

9. The remote control of claim 1, wherein the first and the second optical navigation devices output movement data comprising a representation of a quadrant in which detected motion vectors lie, the representation including at least one of the first proximity signal, the first actuation signal, the second proximity signal, and the second actuation signal.

10. The remote control of claim 1, wherein the first and second optical navigation devices output movement data only if detected motion vectors have a magnitude beyond a predefined threshold.

11. The remote control of claim 1, wherein the first and second optical navigation devices are aligned vertically.

12. The remote control of claim 1, further comprising a sensor configured to sense orientation of the remote control.

13. The remote control of claim 12, wherein the sensor is configured to output an "up" or "down" orientation, and further comprising a processor configured to modify a sense of detected motion by the first and second optical navigation devices in accordance with the sensed orientation.

14. The remote control of claim 12, wherein the sensor is configured to output a measured angle of rotation, and further comprising a processor configured to modify a rate of output movement data based upon the detected rotational position of the remote control.

15. The remote control of claim 12, wherein the sensor is configured to output a measured angle of rotation, and further comprising a processor configured to modify commands output by the remote control based upon the measured angle of rotation.

16. The remote control of claim 1, wherein the remote control generates commands for use with one or more consumer electronic devices.

17. A method of generating a remote control signal, the method comprising;

detecting with a first optical sensor movement of a first finger;

detecting with a first mechanical sensor associated with the first optical sensor a first action by the first finger;

detecting with a second optical sensor movement of a second finger;

detecting with a second mechanical sensor associated with the second optical sensory a second action by the second finger; and combining signals generated by the first optical sensor, the first mechanical sensor, the second optical sensor, and the second mechanical sensor to produce the remote control signal.

18. The method of claim 17, wherein the first optical sensor and first mechanical sensor are operated by a user's thumb and wherein the optical sensor and first mechanical sensor are operated by a user's finger.

19. The method of claim 17, wherein the remote control signal comprises a representation of a quadrant in which detected motion vectors lie.

20. The method of claim 17, wherein the first and second optical sensor and first and second mechanical sensors only output movement data if detected motion vectors have a magnitude beyond a predefined threshold.

21. The method of claim 17, further comprising sensing an orientation of the remote control.

22. The method of claim 21, wherein sensing comprises sensing an "up" or "down" orientation and further comprising processing the sensed orientation to modify a sense of motion of the first and second optical sensor and first and second mechanical sensors.

23. The method of claim 21, wherein sensing comprises sensing a measured rotational position and further comprising processing the sensed rotational position to modify a rate of the output movement data based upon the detected rotational position.

24. The method of claim 21, wherein sensing comprises sensing a measured rotational position and further comprising processing the sensed rotational position to modify commands based upon the detected rotational position.

* * * * *

UNITED STATES PATENT AND TRADEMARK OFFICE

CERTIFICATE OF CORRECTION

PATENT NO. : 9,235,984 B2
APPLICATION NO. : 13/890733
DATED : January 12, 2016
INVENTOR(S) : Jeffrey M. Raynor et al.

It is certified that error appears in the above-identified patent and that said Letters Patent is hereby corrected as shown below:

On the Title Page, the foreign priority claim is missing. Please add the following:

-- (30) Foreign Application Priority Data
May 15, 2012 (GB) ........................... 1208524.7 --

Signed and Sealed this
Twenty-sixth Day of April, 2016

Michelle K. Lee
*Director of the United States Patent and Trademark Office*